United States Patent
Ma et al.

(10) Patent No.: US 11,845,156 B2
(45) Date of Patent: Dec. 19, 2023

(54) POLISHING PAD EMPLOYING POLYAMINE AND CYCLOHEXANEDIMETHANOL CURATIVES

(71) Applicant: Cabot Microelectronics Corporation, Aurora, IL (US)

(72) Inventors: Rui Ma, Aurora, IL (US); Lin Fu, Rancho Palos Verdes, CA (US); Chen-Chih Tsai, Naperville, IL (US); Jaeseok Lee, Beaverton, OR (US); Sarah Brosnan, St. Charles, IL (US)

(73) Assignee: CMC MATERIALS, INC., Aurora, IL (US)

( * ) Notice: Subject to any disclaimer, the term of this patent is extended or adjusted under 35 U.S.C. 154(b) by 576 days.

(21) Appl. No.: 16/923,688

(22) Filed: Jul. 8, 2020

(65) Prior Publication Data
US 2021/0008687 A1    Jan. 14, 2021

Related U.S. Application Data (60) Provisional application No. 62/873,339, filed on Jul. 12, 2019.

(51) Int. Cl.
*B24B 37/24* (2012.01)

(52) U.S. Cl.
CPC .................... *B24B 37/24* (2013.01)

(58) Field of Classification Search
CPC . B24D 3/28; B24D 3/285; B24D 3/30; B24D 3/32; B24D 11/001; B24D 18/00; B24D 18/0009; B24B 37/20; B24B 37/205; B24B 37/22; B24B 37/24
See application file for complete search history.

(56) References Cited

U.S. PATENT DOCUMENTS

| | | | |
|---|---|---|---|
| 2011/0256817 A1 | 10/2011 | Fukuda et al. | |
| 2013/0303061 A1* | 11/2013 | James ................ | B24B 37/24 451/526 |
| 2017/0087688 A1* | 3/2017 | Fu ..................... | B24B 37/24 |

FOREIGN PATENT DOCUMENTS

| TW | 201524676 A | * | 7/2015 | ........... B24B 37/205 |

OTHER PUBLICATIONS

English translation of TW201524676A (Year: 2015).*
Korean Intellectual Property Office /ISA, International Search Report and Written Opinion of the International Searching Authority issued in connection with PCT/US2020/041196 dated Oct. 20, 2020.

* cited by examiner

*Primary Examiner* — Joel D Crandall
*Assistant Examiner* — Sukwoo James Chang (57) ABSTRACT

A chemical-mechanical polishing pad comprising a thermosetting polyurethane polishing layer includes an isocyanate-terminated urethane prepolymer, a polyamine curative, and a cyclohexanedimethanol curative. The polyamine curative and the cyclohexanedimethanol curative are in a molar ratio of polyamine curative to cyclohexanedimethanol curative in a range from about 20:1 to about 1:1.

29 Claims, 3 Drawing Sheets

POLISHING PAD EMPLOYING POLYAMINE AND CYCLOHEXANEDIMETHANOL CURATIVES

CROSS-REFERENCE TO RELATED APPLICATIONS

None.

FIELD OF THE INVENTION

The disclosed embodiments are related to polishing pads and more particularly to thermosetting polyurethane polishing pads including an isocyanate-terminated urethane prepolymer and a polyamine cyclohexanedimethanol curative mixture for use in chemical mechanical polishing (CMP) operations.

BACKGROUND OF THE INVENTION

Chemical mechanical planarization, or chemical mechanical polishing (CMP), is a common technique used to planarize or polish work pieces such as semiconductor wafers. In a conventional CMP operation, the wafer is mounted on a carrier (polishing head) which is positioned in contact with a polishing pad in a CMP apparatus (polishing tool). A carrier assembly applies a controllable force to the wafer, pressing it against the polishing pad. A chemical-mechanical polishing composition (e.g., a slurry) is dispensed onto the surface (polishing layer) of the pad while the substrate and pad are moved (e.g., rotated) relative to one another. The wafer surface is polished and made planar by chemical and mechanical action of the polishing layer and polishing composition on the surface.

A number of chemical-mechanical polishing (CMP) operations are used in both front-end-of-the-line (FEOL) and back-end-of-the-line (BEOL) processing of semiconductor devices. For example, the following CMP operations are commonly employed. Shallow trench isolation (STI) is an FEOL process used prior to formation of the transistors to form a pattern of inlaid tetraethyl orthosilicate (TEOS) in the silicon wafer. Tungsten plug and interconnect and copper interconnect and dual damascene processes are BEOL processes used to form the network of metal wires that connect the device transistors.

Commercially available CMP polishing pads are commonly fabricated from polyurethane materials (such as thermosetting and thermoplastic polyurethane). As is known to those of ordinary skill in the art, there is a challenging trade off when designing and selecting CMP polishing pads. In many CMP applications polishing pads made of harder materials tend to exhibit higher removal rates, superior planarization efficiency, and a longer useful pad life than polishing pads made of softer materials. However, harder pads also tend to impart more defects (such as scratches) to the wafer surface than softer pads. Such defects can negatively impact product yield and are therefore costly. Many CMP operations overcome this challenge by implementing at least two polishing steps, a first step that makes use of a harder pad to achieve good planarization efficiency at high throughput (owing to the higher removal rates) and a second step that makes use of a softer pad to remove defects imparted by the first step. While such operations can be serviceable, they tend be costly in that they require the use of additional polishing steps. There remains a need in the industry for polishing pads that are capable of achieving high removal rates, excellent planarization efficiency, long pad life, and reduced defectivity. Currently available pads are generally deficient in at least one of these categories.

BRIEF SUMMARY OF THE INVENTION

A chemical-mechanical polishing pad comprising a thermosetting polyurethane polishing layer is disclosed. The polishing layer includes an isocyanate-terminated urethane prepolymer, a polyamine curative, and a cyclohexanedimethanol curative, wherein the polyamine curative and the cyclohexanedimethanol curative are in a molar ratio of polyamine curative to cyclohexanedimethanol curative in a range from about 20:1 to about 1:1.

The disclosed pads may provide various advantages, for example, including both good planarization efficiency and low defectivity. The disclosed pads may further provide high removal rates and long pad life.

BRIEF DESCRIPTION OF THE DRAWINGS

For a more complete understanding of the disclosed subject matter, and advantages thereof, reference is now made to the following descriptions taken in conjunction with the accompanying figures.

DETAILED DESCRIPTION OF THE INVENTION

A chemical-mechanical polishing pad comprising a thermosetting polyurethane polishing layer is disclosed. The polishing layer includes an isocyanate-terminated urethane prepolymer and a curative mixture comprising, consisting of, or consisting essentially of a polyamine curative and a cyclohexanedimethanol curative. The curative mixture includes from about 5 to about 50 mole percent of the cyclohexanedimethanol curative.

The invention is directed to a chemical-mechanical polishing pad comprising a thermosetting polyurethane polishing layer that is intended to provide both good planarization efficiency and low defectivity. The polishing pad of the invention has applicability in polishing a wide variety of semiconductor wafers used in the fabrication of integrated circuits and other microdevices. Such wafers can be of conventional node configuration, e.g., technology nodes of 90 nm, 80 nm, 65 nm, 55 nm, 45 nm, 40 nm, or less. However, in some embodiments, the inventive polishing pad may be particularly well suited for advanced node applications (e.g., technology nodes of 28 nm, 22 nm, 20 nm, 16 nm, 14 nm, 10 nm, or less). It will be understood that, as node technology becomes more advanced (smaller), the elimination of polishing induced defects becomes more important and the planarization efficiency requirements become more stringent. Owing to the improvement in planarization efficiency and defect performance provided, the disclosed polishing pads may be particularly well suited for advanced node applications. However, as noted, the inventive polishing pad is not limited to use with advanced node wafers, nor is it limited to the characterization of a wafer as conventional or advanced node. The inventive pads may, of course, be used to polish substantially any wafer or workpieces as desired.

Thermoset polyurethane (TSU) pads are widely used in the field of chemical mechanical polishing (CMP). For example, the IC1000® pad (available from DuPont) and the NexPlanar® brand pads (available from Cabot Microelectronics) are commercially available TSU pads. Thermoplastic polyurethane (TPU) pads are also used in commercial CMP operations. For example, Epic® brand pads (available from Cabot Microelectronics) are commercially available TPU pads. TSU pads may provide superior conditionability and pad life as compared to comparable TPU pads (possibly owing to extensive chemical crosslinking in TSU materials). On the other hand TPU pads commonly provide superior defect performance as compared to TSU pads (possibly owing to the viscous characteristics of the TPU material—such as the softening of the TPU material at elevated polishing temperatures).

As is known to those of ordinary skill in the art, polishing pads are commonly characterized based on the bulk mechanical properties of the pad. For example, polishing pads are commonly characterized based on the hardness (e.g., the Shore D hardness) of the pad and/or the storage modulus (E') of the pad (e.g., based on dynamic mechanical analysis). Hard pads are commonly believed to promote good planarization efficiency while soft pads are commonly believed to promote good defect performance.

The instant invention is predicated, at least in part, on the surprising and unexpected discovery that use of a curative mixture in which a portion of a polyamine curative is replaced with cyclohexanedimethanol (CHDM) may result in a thermosetting polyurethane polishing pad that combines the benefits of TSU and TPU polishing pads. CHDM is believed to form urethane linkages with the isocyanate-terminated urethane prepolymer and thereby provide improved viscoelastic properties (e.g., softening of the resulting polyurethane at polishing temperatures). The resulting polishing pads are observed to provide improved planarization efficiency, improved defect performance, and improved conditionability in various CMP applications.

As is also known to those of ordinary skill in the art, commercial polishing pads are commonly conditioned during a CMP operation. During such conditioning the pad is abraded, for example, using a diamond abrasive conditioning disk. The conditioning is believed to abrade and roughen the pad surface, thereby forming surface asperities which engage the wafer surface during the CMP operation. One aspect of the instant invention was the realization that use of the above described curative blend including a polyamine curative and CHDM may enable an advantageous balance to be achieved between the bulk pad properties and the properties of the surface asperities during a CMP operation. For example, the use of a mixed polyamine CHDM curative may result in a thermosetting polishing pad in which the bulk pad tends to be hard and stiff to promote planarization efficiency and in which the surface asperities tend to be relatively soft at polishing temperature (soft relative to the bulk pad) to promote low defectivity.

The inventive pads include a polishing layer fabricated by combining a urethane prepolymer and a curative to form a thermosetting polyurethane. The urethane prepolymer is an isocyanate-terminated urethane prepolymer that may be prepared by reacting a polyfunctional aromatic isocyanate and a prepolymer polyol. Example polyfunctional aromatic isocyanates may include a toluene diisocyanate (TDI) compound such as 2,4-TDI, 2,6-TDI, and mixtures thereof; a methylenediphenyl diisocyanate (MDI) compound such as 2,2'-MDI, 2,4'-MDI, and 4,4'-MDI (which is also referred to in the art as 4,4'-diphenylmethane diisocyanate), and mixtures thereof, a naphthalene-1,5-diisocyanate, a tolidine diisocyanate, a para-phenylene diisocyanate, a xylylene diisocyanate, and mixtures thereof. The prepolymer polyol may include substantially any suitable diol, polyol, polyol-diol, as well as copolymers and mixtures thereof. For example, the prepolymer polyol may be selected from the group comprising, consisting of, or consisting essentially of polytetramethylene ether glycol (PTMEG), polypropylene ether glycol (PPG), ethylene oxide capped PTMEG or PPG, polycaprolactone, ester-based polyols, such as ethylene or butylene adipates, copolymers thereof and mixtures thereof. It will be understood that suitable polyols such as PTMEG and PPG may be mixed with low molecular weight polyols, including ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-L5-pentanediol, 1,6-hexanediol, diethylene glycol, dipropylene glycol, tripropylene glycol and mixtures thereof.

The urethane prepolymers are often characterized by the weight percent of unreacted isocyanate groups (NCO) present in the prepolymer. Weight percent NCO can be used to determining mixing ratios of components for producing polyurethane materials. In preferred embodiments, the polyfunctional aromatic diisocyante includes a TDI, an MDI, or a mixture thereof and the prepolymer polyol includes PTMEG, PPG, or a mixture thereof. In such embodiments, isocyanate-terminated urethane prepolymer may have a weight percent NCO in a range from about 6.0 to about 20.0 weight percent, for example, from about 7.0 to about 12.0 weight percent.

In certain embodiments a commercially available isocyanate-terminated urethane prepolymer may be advantageously employed. Suitable commercially available prepolymers include, for example, DESMODUR® Prepolymers (manufactured by Covestro), Andur® prepolymers (supplied by Anderson Development Company), Adiprene® prepolymers (manufactured by Chemtura), and Imuthane® prepolymers (manufactured by COIM USA, Inc.). Suitable prepolymers may include, for example, PET-70D, PHP-70D, PET-75D, PHP-75D, PPT-75D, PHP-80D, LFG-740D, LF-650D, LF-700D, LF-750D, LF-751D, LF-753D, 60DPLF, 70DP, 70DPLF, 7DPLM, 7201DPLF, 73DPLF, 7-5DPLF, 1-75DP, 2-72DP, 75DGP-2, 7500DP, 75DPLF, 7500DP, 7501DP, 80DPLF, 81DP, 82DGP, IP 89, LU-T60D, LU-T70D, LU-T75D, MAX T-80, MD15120.

Those of ordinary skill in the art will readily appreciate that commercially available prepolymers are commonly categorized using a hardness scale (which generally correlates with a hardness of the corresponding polyurethane reaction product). For example, Imuthane® PET-70D and PHP-70D, Adiprene® LF700D, and Andur® 70DP and 70DPLF may be referred to as 70D prepolymers indicating a corresponding hardness of 70 on the Shore D hardness scale. Likewise, Imuthane® PET-75D, PHP-75D, and PPT-75D, Adiprene® LF750D, LF751D, and LF753D, Andur® 75DGP-2, 75DPLF, 7500DP, and 7501DP and DESMODUR® LU-T75D may be referred to as 75D prepolymers indicating a corresponding hardness of 75 on the Shore D hardness scale. And Imuthane® PHP-80D and Andur® 80DPLF may be referred to as 80D prepolymers indicating a corresponding hardness of 80D on the Shore D hardness scale.

In preferred embodiments, a hard prepolymer is employed. By hard it is meant that the prepolymer may be categorized as having a Shore D hardness value greater than or equal to about 70 (e.g., greater than or equal to about 75). Suitable hard prepolymers may have a Shore D hardness in a range from about 70 to about 85 (e.g., from about 75 to about 85 or from about 75 to about 80). Hard prepolymers may include, for example, 70D, 75D, and 80D prepolymers (e.g., 75D and 80D prepolymers), such as those listed in the preceding paragraphs, however, the disclosed embodiments are of course not limited in this regard. Suitable prepolymers may also include a mixture of two or more commercially available prepolymers, for example, including a mixture of a 70D prepolymer and a 75D prepolymer, a mixture of a 75D prepolymer and an 80D prepolymer, or a mixture of a 70D prepolymer and an 80D prepolymer.

As stated above, the inventive pads include a polishing layer fabricated by combining at least one urethane prepolymer (e.g., including at least one hard prepolymer) and a curative to form the thermosetting polyurethane. The disclosed polishing pad embodiments employ first and second curatives (e.g., a mixed or blended curative composition including first and second curatives) including a first polyamine curative and a second cyclohexanedimethanol (CHDM) curative.

The polyamine curative may include substantially any suitable polyamine, for example including diamines and other multifunctional amines. The polyamine curative may be a low molecular weight polyamine curative. By low molecular weight it is meant that the polyamine curative has a molecular weight of less than 1000 g/mol (e.g., less than 700 g/mol, less than 500 g/mol, or less than 300 g/mol).

Example diamines may include aniline diamine compounds, toluene diamine compounds, aminobenzoate compounds, and mixtures thereof. Example aniline diamine compounds include 4,4-methylenebis(2-chloroaniline) (MBCA or MOCA); 4,4'-methylene-bis-o-chloroaniline (MbOCA); 4,4'-methylene-bis-(3-chloro-2,6-diethylaniline) (MCDEA); 4,4'-methylene-bis-aniline; and 1,2-bis(2-aminophenylthio)ethane. Example toluene diamine compounds include dimethylthiotoluenediamine; diethyltoluenediamine; 5-tert-butyl-2,4- and 3-tert-butyl-2,6-toluenediamine; 5-tert-amyl-2,4- and 3-tert-amyl-2,6-toluenediamine; and chlorotoluenediamine. Example aminobenzoate compounds include trimethyleneglycol di-p-aminobenzoate; polytetramethyleneoxide di-p-aminobenzoate; polytetramethyleneoxide mono-p-aminobenzoate; polypropyleneoxide di-p-aminobenzoate; and polypropyleneoxide mono-p-aminobenzoate.

Aniline diamine compounds, such as 4,4-methylenebis (2chloroaniline), and toluene diamine compounds, such as dimethylthiotoluenediamine, are preferred (although the disclosed embodiments are expressly not limited in this regard). Such diamine compounds are commercially available, for example, from Albemarle Corporation, Makro Chemical, Gantrade Corporation, and Evonik.

The cyclohexanedimethanol (CHDM) curative (also commonly referred to as 1,4-cyclohexanedimethanol and 1,4-Bis(hydroxymethyl)cyclohexane) is a di-substituted derivative of cyclohexane and is classified as a diol (having two OH groups). The chemical formula of CHDM is $C_6H_{10}(CH_2OH)_2$ with cis and trans stereoisomers being known. Commercially available CHDM is generally a mixture of the cis and trans isomers. The disclosed embodiments are not limited to any particular CHDM isomer or to any particular ratio of isomers, such as a ratio of the cis and trans isomers.

While not wishing to be bound by theory, CHDM is believed to act as a mild softening agent. Replacing a portion of the polyamine curative with CHDM (to form a curative mixture) is believed to result in the formation of urethane linkages between diisocyanate and the CHDM instead of urea linkages between diisocyanate and the polyamine. It has been found that use of an appropriate ratio of polyamine curative to CHDM may result in a pad having the above described balance in which the bulk pad tends to be hard and stiff to promote planarization efficiency and the surface asperities tend to be relatively soft at polishing temperatures (e.g., temperatures in a range from about 50 to about 80 degrees C.) to promote low defectivity. The use of too much CHDM (a low ratio of polyamine to CHDM) tends to result in a soft pad that has insufficient bulk stiffness while the use of too little CHDM (a high ratio of polyamine to CHDM) tends to result in a hard pad in which the surface asperities are not sufficiently soft at polishing temperature. Moreover, it has also been found that the preferred ratio of polyamine curative to CHDM may depend on the hardness of the isocyanate terminated prepolymer, with harder prepolymers sometimes requiring more CHDM (a lower ratio) to achieve the above described property balance. The preferred ratio of polyamine curative to CHDM may also depend on the CMP applications and specific CMP conditions (such as downforce, platen speed, and slurry flow rate).

The first and second curatives (the polyamine and CHDM curatives) are preferably used in a molar ratio of polyamine curative to CHDM curative in a range from about 20:1 to about 1:1 (e.g., from about 15:1 to about 1:1, from about 10:1 to about 1:1, from about 9:1 to about 1:1, from about 7:1 to about 1.5:1, from about 6:1 to about 1.5:1, or from about 6:1 to about 2:1). Stated another way, the first and second curatives may be thought of as forming a curative mixture (or blend) comprising, consisting of, or consisting essentially of a polyamine curative and a CHDM curative. The curative mixture preferably includes from about 5 to about 50 mole percent of the CHDM curative (e.g., from about 10 to about 50 mole percent, from about 5 to about 40 mole percent, from about 10 to about 40 mole percent, from about 12 to about 40 mole percent, from about 15 to about 40 mole percent, or from about 15 to about 35 mole percent).

It will be appreciated that the preferred proportion of polyamine curative to CHDM curative in the curative mixture may depend on the choice of prepolymer. For example, when the prepolymer includes 75D prepolymer, the curative mixture may include from about 5 to about 35 mole percent CHDM (e.g., from about 5 to about 30 mole percent, from about 5 to about 25 mole percent, from about 10 to about 30 mole percent, or from about 10 to about 25 mole percent). Likewise, when the prepolymer includes an 80D prepolymer, the curative mixture may include from about 10 to about 50 mole percent CHDM (e.g., from about 10 to about 45 mole percent, from about 10 to about 40 mole percent, from about 15 to about 40 mole percent, or from about 15 to about 35 mole percent).

It will be understood that the thermosetting polyurethane polishing layer of the disclosed polishing pad embodiments may be porous or non-porous. A porous polishing layer may be prepared, for example, via forming a thermosetting polyurethane foam, via including a soluble porogen in the polyurethane composition, or via including hollow microspheres (e.g., polymeric microspheres) in the polyurethane composition. Porous embodiments may have substantially any suitable porosity, for example, ranging from about 5 to about 60 volume percent (e.g., from about 10 to about 50 volume percent, from about 15 to about 50 volume percent, or from about 20 to about 40 volume percent). Non-porous embodiments are substantially fully dense and generally have a porosity of less than about 5 volume percent.

Those of ordinary skill in the art will readily appreciate that the porosity of a polishing pad (or a polishing layer within a pad) may be estimated via measuring the apparent density of the pad (or layer). Fully dense embodiments (i.e., non-porous embodiments) generally have a density of about 1.2 $g/cm^3$ (e.g., from about 1.15 to about 1.25 $g/cm^3$). Porous embodiments generally have an apparent density of less than about 1.2 $g/cm^3$, for example, an apparent density ranging from about 0.6 to about 1.14 $g/cm^3$ (e.g., from about 0.72 to about 1.08 $g/cm^3$, from about 0.72 to about 1.02 $g/cm^3$, or from about 0.78 to about 0.96 $g/cm^3$). The disclosed embodiments are of course not limited in regards to the apparent density of the pad or polishing layer.

As noted above, commercial polishing pads are commonly conditioned during a CMP operation, thereby forming surface asperities. These surface asperities interact with the wafer during the CMP operation and can strongly influence the resulting polishing performance. Evaluation of surface asperity properties may therefore provide an indication of pad performance.

While the disclosed embodiments are not limited in this regard (unless otherwise specified by specific elements in the claims), the mechanical properties of the surface asperities may be estimated, for example, via evaluating the mechanical properties of a substantially fully dense polishing pad coupon fabricated from the same polyurethane material. While not wishing to be bound by theory, the surface asperities are known to be small features, for example on a scale ranging from sub-micron to tens of microns, and are therefore believed to be substantially non-porous. It is therefore believed that the mechanical properties of a substantially fully dense pad (e.g., a pad having a porosity of less than about 5 volume percent) may suitably represent (or approximate) the mechanical properties of the surface asperities (the polyurethane matrix material from which the surface asperities are formed during conditioning).

The parameter values (and ranges) disclosed below (and in the claims) are therefore based on measurements made on substantially non-porous pad coupon samples having no grooves or other surface features intended to transport or hold slurry during a polishing operation. The measurement methods used to measure the tensile storage modulus (E') at 25 and 75 degrees C., the Shore D hardness, and tensile toughness are described in more detail below in Examples 2 through 4.

In certain embodiments, the above described surface asperities may be characterized based on a ratio of the tensile storage modulus (E') at 25 degrees C. and the tensile storage modulus at 75 degrees C., a tensile storage modulus (E') at 25 degrees C., a Shore D hardness at 25 degrees C., and a tensile toughness at 25 degrees C. For example, the surface asperities may have a ratio of a tensile storage modulus (E') at 25 degrees C. to a tensile storage modulus at 75 degrees C. in a range from about 3:1 to about 20:1 (e.g., from about 3:1 to about 15:1, from about 4:1 to about 15:1, from about 4:1 to about 12:1, from about 5:1 to about 12:1, or from about 5:1 to about 10:1).

Moreover, in embodiments in which the isocyanate-terminated urethane prepolymer includes a 75D prepolymer, the surface asperities may have a tensile storage modulus (E') at 25 degrees C. of greater than about 500 MPa (e.g., greater than about 600 MPa, greater than about 700 MPa, or greater than about 800 MPa). In such embodiments including a 75D prepolymer, the surface asperities may alternatively and/or additionally have a Shore D hardness at 25 degrees C. greater than about 55 (e.g., greater than about 60, greater than about 65, or greater than about 68). These embodiments may further (alternatively and/or additionally) have a tensile toughness at 25 degrees C. greater than about 80 MPa (e.g., greater than about 100 MPa).

In embodiments in which the isocyanate-terminated urethane prepolymer includes an 80D prepolymer, the surface asperities may have a tensile storage modulus (E') at 25 degrees C. of greater than about 800 MPa (e.g., greater than about 1000 MPa, greater than about 1100 MPa, or greater than about 1200 MPa). In such embodiments including an 80D prepolymer, the surface asperities may alternatively and/or additionally have a Shore D hardness at 25 degrees C. greater than about 65 (e.g., greater than about 70 or greater than about 72). These embodiments may further (alternatively and/or additionally) have a tensile toughness at 25 degrees C. greater than about 20 MPa (e.g., greater than about 40 MPa, or greater than about 50 MPa).

The disclosed pads may be fabricated using substantially any suitable pad manufacturing techniques, such as but not limited to casting, molding, coating, extruding, printing, sintering, spraying, and the like (the disclosed pad embodiments are not limited in this regard). For example, the inventive pad may be fabricated using various known molding and casting techniques. Molded polyurethane pads may be particularly suitable for planarizing semiconductor substrates. Such pads may be individually manufactured, for example, via dividing the raw materials into two batches. The first batch of raw materials may include the isocyanate-terminated prepolymer and certain optional additives including lubricants and porosity forming agents, such as microspheres or gas. The second batch of raw materials may include the curative mixture (the polyamine and CHDM curatives) and certain other optional additives such as ultraviolet stabilizers. The two batches may be individually prepared and then blended together at a predetermined blend ratio and temperature. The mixture may then be poured into a mold where it is maintained at an elevated temperature, for example, between about 60 degrees C. and about 160 degrees C. The mold may optionally be deployed in a closed chamber and exposed to vacuum or pressure to expel air trapped in the poured blend. After a predetermined time (e.g., about 10 to about 30 minutes), the pad may be removed from the mold and then cured approximately 6 to 12 hours at a temperature in a range from about 30 degrees C. to about 100 degrees C.

It will be understood that this disclosure may include numerous embodiments. These embodiments include, but are not limited to, the following embodiments.

A first embodiment may comprise a chemical-mechanical polishing pad comprising a thermosetting polyurethane polishing layer, the thermosetting polishing layer comprising an isocyanate-terminated urethane prepolymer; a polyamine curative; and a cyclohexanedimethanol curative; wherein the polyamine curative and the cyclohexanedimethanol curative are in a molar ratio of polyamine curative to cyclohexanedimethanol curative in a range from about 20:1 to about 1:1.

A second embodiment may include the first embodiment, wherein the prepolymer is a reaction product of a toluene diisocyante (TDI) compound or a methylenediphenyl diisocyanate (MDI) compound and polytetramethylene ether glycol (PTMEG) or polypropylene ether glycol.

A third embodiment may include the first or second embodiment, wherein the prepolymer is an aromatic prepolymer selected from the group consisting of 75D prepolymers, 80D prepolymers, and mixtures thereof.

A fourth embodiment may include any one of the first through third embodiments wherein the polyamine curative is an aromatic diamine curative selected from the group consisting of aniline diamine compounds, toluene diamine compounds, aminobenzoate compounds, and mixtures thereof.

A fifth embodiment may include the fourth embodiment, wherein the aromatic diamine curative is selected from the group consisting of 4,4-methylenebis(2chloroaniline), dimethylthiotoluenediamine, and mixtures thereof.

A sixth embodiment may include any one of the first through fifth embodiments, wherein the molar ratio of polyamine curative to cyclohexanedimethanol curative is in a range from about 7:1 to about 1.5:1.

A seventh embodiment may include any one of the first through sixth embodiments, wherein the thermosetting polyurethane polishing layer comprises surface asperities and wherein the surface asperities have a ratio of a storage modulus at 25 degrees C. to a storage modulus at 75 degrees C. in a range from about 3 to about 20.

An eighth embodiment may include the seventh embodiment wherein: (i) the isocyanate-terminated urethane prepolymer includes a 75D prepolymer and (ii) the surface asperities have a storage modulus (E') at 25 degrees C. greater than about 500 MPa and a Shore D hardness at 25 degrees C. greater than about 60.

A ninth embodiment may include the eighth embodiments, wherein the surface asperities have a tensile toughness at 25 degrees C. greater than about 100 MPa.

A tenth embodiment may include the seventh embodiment wherein: (i) the isocyanate-terminated urethane prepolymer includes an 80D prepolymer and (ii) the surface asperities have a storage modulus (E') at 25 degrees C. greater than about 1000 MPa and a Shore D hardness at 25 degrees C. greater than about 70.

An eleventh embodiment may include the tenth embodiment, wherein surface asperities have a tensile toughness at 25 degrees C. greater than about 50 MPa.

A twelfth embodiment may include any one of the first through eleventh embodiments, wherein the thermosetting polyurethane polishing layer further comprises a sufficient quantity of hollow microspheres such that the thermosetting polyurethane polishing layer has a porosity in a range from about 10 to about 50 percent.

A thirteenth embodiment may include any one of the first through twelfth embodiments, wherein: (i) the prepolymer is an aromatic prepolymer selected from the group consisting of 75D prepolymers, 80D prepolymers, and mixtures thereof, (ii) the polyamine curative is an aromatic diamine curative selected from the group consisting of 4,4-methylenebis(2chloroaniline), dimethylthiotoluenediamine, and mixtures thereof, and (iii) the molar ratio of polyamine curative to cyclohexanedimethanol curative is in a range from about 10:1 to about 1.5:1.

A fourteenth embodiment may include any one of the first through thirteenth embodiments, wherein the thermosetting polyurethane polishing layer is adhered to a sub-pad.

A fifteenth embodiment may comprise a thermosetting polyurethane polymer polishing layer, the thermosetting polishing layer comprising: an isocyanate-terminated urethane prepolymer and a curative mixture comprising a polyamine curative and a cyclohexanedimethanol curative, wherein the curative mixture comprises from about 5 to about 50 mole percent of the cyclohexanedimethanol curative.

A sixteenth embodiment may include the fifteenth embodiment wherein the prepolymer is a reaction product of a toluene diisocyante (TDI) compound or a methylenediphenyl diisocyanate (MDI) compound and polytetramethylene ether glycol (PTMEG) or polypropylene ether glycol.

A seventeenth embodiment may include any one of the fifteenth through sixteenth embodiments, wherein the prepolymer is an aromatic prepolymer selected from the group consisting of 75D prepolymers, 80D prepolymers, and mixtures thereof.

An eighteenth embodiment may include any one of the fifteenth through seventeenth embodiments, wherein the polyamine curative is an aromatic diamine curative selected from the group consisting of aniline diamine compounds, toluene diamine compounds, aminobenzoate compounds, and mixtures thereof.

A nineteenth embodiment may include the eighteenth embodiment wherein the aromatic diamine curative is selected from the group consisting of 4,4-methylenebis (2chloroaniline), dimethylthiotoluenediamine, and mixtures thereof.

A twentieth embodiment may include any one of the fifteenth through nineteenth embodiments, wherein the curative mixture comprises from about 10 to about 40 weight percent of the cyclohexanedimethanol curative.

A twenty-first embodiment may include any one of the fifteenth through twentieth embodiments, wherein the curative mixture consists of the polyamine curative and the cyclohexanedimethanol curative.

A twenty-second embodiment may include any one of the fifteenth through twenty-first embodiments, wherein the thermosetting polyurethane polishing layer comprises surface asperities and wherein the surface asperities have a ratio of a storage modulus at 25 degrees C. to a storage modulus at 75 degrees C. in a range from about 3 to about 20.

A twenty-third embodiment may include the twenty-second embodiment, wherein: (i) the isocyanate-terminated urethane prepolymer includes a 75D prepolymer and (ii) the surface asperities have a storage modulus (E') at 25 degrees C. greater than about 500 MPa and a Shore D hardness at 25 degrees C. greater than about 60.

A twenty-fourth embodiment may include the twenty-third embodiment, wherein the surface asperities have a tensile toughness at 25 degrees C. greater than about 100 MPa.

A twenty-fifth embodiment may include the twenty-second embodiment, wherein: (i) the isocyanate-terminated urethane prepolymer includes an 80D prepolymer and (ii) the surface asperities have a storage modulus (E') at 25 degrees C. greater than about 1000 MPa and a Shore D hardness at 25 degrees C. greater than about 70.

A twenty-sixth embodiment may include the twenty-fifth embodiment, wherein the surface asperities have a tensile toughness at 25 degrees C. greater than about 50 MPa.

A twenty-seventh embodiment may include any one of the fifteenth through twenty-sixth embodiments, wherein the thermosetting polyurethane polishing layer further comprises a sufficient quantity of hollow microspheres such that the thermosetting polyurethane polishing layer has a porosity in a range from about 10 to about 50 percent.

A twenty-eighth embodiment may include any one of the fifteenth through twenty-seventh embodiments, wherein: (i) the prepolymer is an aromatic prepolymer selected from the group consisting of 75D prepolymers, 80D prepolymers, and mixtures thereof; (ii) the polyamine curative is an aromatic diamine curative selected from the group consisting of 4,4-methylenebis(2chloroaniline), dimethylthiotoluenediamine, and mixtures thereof; and (iii) the curative mixture comprises from about 10 to about 40 weight percent of the cyclohexanedimethanol curative.

A twenty-ninth embodiment may include any one of the fifteenth through twenty-eighth embodiments, wherein the thermosetting polyurethane polishing layer is adhered to a sub-pad.

A thirtieth embodiment may include a method for fabricating a thermosetting polishing pad, the method comprising: (a) admixing an isocyanate-terminated urethane prepolymer, a polyamine curative; and a cyclohexanedimethanol curative, wherein the diamine curative and the cyclohexanedimethanol curative are in a molar ratio of diamine curative to cyclohexanedimethanol curative in a range from about 20:1 to about 1:1 to obtain a mixture; (b) heating the mixture in a mold to obtain a pre-cured pad; and (c) curing the pre-cured pad to obtain a polishing pad.

A thirty-first embodiment may include the thirtieth embodiment and may further comprise: (d) machining the polishing pad to remove a mold skin and to obtain a polishing pad having a desired thickness.

A thirty-second embodiment may include the thirty-first embodiment and may further comprise: (e) adhering the polishing pad to a sub-pad to obtain a multi-layer polishing pad.

A thirty-third embodiment may include any one of the thirtieth through the thirty thirty-second embodiments wherein: (i) the prepolymer is an aromatic prepolymer selected from the group consisting of 75D prepolymers, 80D prepolymers, and mixtures thereof; (ii) the polyamine curative is an aromatic diamine curative selected from the group consisting of 4,4-methylenebis(2chloroaniline), dimethylthiotoluenediamine, and mixtures thereof; and (iii) the molar ratio of polyamine curative to cyclohexanedimethanol curative is in a range from about 10:1 to about 1.5:1.

A thirty-fourth embodiment may include a method of chemical mechanical polishing a semiconductor substrate, the method comprising: (a) contacting the substrate with a polishing pad and a polishing composition, wherein the polishing pad may be selected from any one of the first through the twenty-ninth embodiments, (b) moving the polishing pad relative to the substrate; and (c) abrading the substrate to remove a portion of a layer from the substrate and thereby polish the substrate.

A thirty-fifth embodiment may include the thirty-fourth embodiment, wherein: (i) the prepolymer is an aromatic prepolymer selected from the group consisting of 75D prepolymers, 80D prepolymers, and mixtures thereof; (ii) the polyamine curative is an aromatic diamine curative selected from the group consisting of 4,4-methylenebis (2chloroaniline), dimethylthiotoluenediamine, and mixtures thereof; and (iii) the molar ratio of polyamine curative to cyclohexanedimethanol curative is in a range from about 10:1 to about 1.5:1.

The following examples further illustrate the invention but, of course, should not be construed as in any way limiting its scope.

Example 1

A number of non-porous polishing pad coupons were prepared for evaluating the effect of CHDM on mechanical properties (as described in more detail below in Examples 2-4). The coupons were prepared by mixing prepolymer, diamine curative, and an optional diol curative. The mixture was poured on a nine-inch square preheated mold base where it was compression molded at 260 degrees F. for 10 min. The pre-cured pad coupons were then released from the mold and cured in a vented oven for 12 hours at a temperature of 200 degrees F. The coupons were then cut into samples for mechanical testing.

Table 1A lists 11 experimental pad coupons 1A, 1B, 1C, 1D, 1E, 1F, 1G, 1H, 1J, and 1K that included various prepolymer/diamine curative/diol compositions. Each of the compositions in Table 1A included Imuthane® PET-75D prepolymer and dimethylthiotoluenediamine curative. The compositions are listed as part by weight with each composition normalized to 100 parts by weight prepolymer. For example, pad coupon 1B included 100 parts by weight Imuthane® PET-75D, 18.7 parts by weight dimethylthiotoluenediamine, and 2.2 parts by weight CHDM.

Experimental coupon 1A was comparative in that it did not include a diol curative. Experimental pads 1B, 1C, 1D, 1E, 1F, 1G, 1H, 1I, 1J, and 1K included various diol curatives, including CHDM (1B and 1C), 2-methyl-1,3 propane diol (PDO) (1D and 1E), 1,4 Butane diol (BDO) (1F and 1G), diethylene glycol (DEG) (1H and H), and 1,6 Hexane diol (HDO) (1J and 1K). The experimental pad coupons included diamine to diol molar ratios of about 5.5 to 1 (1B, 1D, 1F, 1H, and 1J) and about 2.3 to 1 (1C, 1E, 1G, 1I, and 1K).

TABLE 1A

| Coupon | PET-75D | Dimethylthio toluenediamine | Diol |
|---|---|---|---|
| 1A | 100 parts | 22.0 parts | None |
| 1B | 100 parts | 18.7 parts | 2.2 parts CHDM |
| 1C | 100 parts | 15.4 parts | 4.4 parts CHDM |
| 1D | 100 parts | 18.7 parts | 1.4 parts PDO |
| 1E | 100 parts | 15.4 parts | 2.8 parts PDO |
| 1F | 100 parts | 18.7 parts | 1.4 parts BDO |
| 1G | 100 parts | 15.4 parts | 2.8 parts BDO |
| 1H | 100 parts | 18.7 parts | 1.6 parts DEG |
| 1I | 100 parts | 15.4 parts | 3.2 parts DEG |
| 1J | 100 parts | 18.7 parts | 1.8 parts HDO |
| 1K | 100 parts | 15.4 parts | 3.6 parts HDO |

Table 1B lists 4 additional pad coupons 1L, 1M, 1N, and 1O that included the Andur® 80DPLF prepolymer, dimethylthiotoluenediamine curative, and optional CHDM curative (listed in parts by weight as described above). Experimental coupon 1L was comparative in that it did not include CHDM curative. The experimental pad coupons 1M, 1N, and 1O included diamine to CHDM molar ratios of about 5.5 to 1 (1M), about 2.3 to 1 (1N), and about 1.2 to 1 (1O).

TABLE 1B

| Coupon | 80DPLF | Dimethylthio toluenediamine | Diol |
|---|---|---|---|
| 1L | 100 parts | 25.7 parts | None |
| 1M | 100 parts | 21.8 parts | 2.6 parts CHDM |

TABLE 1B-continued

| Coupon | 80DPLF | Dimethylthio toluenediamine | Diol |
|---|---|---|---|
| 1N | 100 parts | 18.0 parts | 5.2 parts CHDM |
| 1O | 100 parts | 14.1 parts | 7.8 parts CHDM |

Table 1C lists 3 additional pad coupons 1P, 1Q, and 1R that included a 50/50 mixture of the Imuthane® PET-75D and Andur® 80DPLF prepolymers, dimethylthiotoluenediamine curative, and optional CHDM curative (listed in parts by weight as described above). Experimental coupon 1P was comparative in that it did not include CHDM curative. The experimental pad coupons 1Q and 1R included diamine to CHDM molar ratios of about 9 to 1 (1Q) and about 4 to 1 (1R).

TABLE 1C

| Coupon | Prepolymer | Dimethylthio Toluenediamine | Diol |
|---|---|---|---|
| 1P | 50 parts 75D<br>50 parts 80D | 24.6 parts | None |
| 1Q | 50 parts 75D<br>50 parts 80D | 22.2 parts | 1.7 parts CHDM |
| 1R | 50 parts 75D<br>50 parts 80D | 19.7 parts | 3.4 parts CHDM |

Example 2

The Shore D hardness and the density of each of the pad coupons disclosed in Example 1 were measured in this example. The Shore D hardness was measured at 25 degrees C. using a standard durometer hardness test according to the procedure set forth in ASTM 2240 and ISO 868. The density was measured using a Mettler Toledo Pycnometer model AG285 or XS205. The samples were cut into 1-inch diameter circles. The samples displaced isopropyl alcohol in a wet pycnometer and the apparent density was determined by the gravimetric method. Tables 2A, 2B, and 2C list the Shore D hardness values and the density values for each of the pad coupons listed above in Tables 1A, 1B, and 1C.

TABLE 2A

| Coupon | Hardness (Shore D) | Apparent Density (grams/cm$^3$) |
|---|---|---|
| 1A | 75 | 1.17 |
| 1B | 72 | 1.17 |
| 1C | 66 | 1.16 |
| 1D | 73 | 1.17 |
| 1E | 69 | 1.16 |
| 1F | 72 | 1.17 |
| 1G | 68 | 1.16 |
| 1H | 73 | 1.17 |
| 1I | 69 | 1.16 |
| 1J | 71 | 1.17 |
| 1K | 68 | 1.16 |

TABLE 2B

| Coupon | Hardness (Shore D) | Apparent Density (grams/cm$^3$) |
|---|---|---|
| 1L | 78 | 1.21 |
| 1M | 76 | 1.20 |
| 1N | 76 | 1.20 |
| 1O | 75 | 1.19 |

TABLE 2C

| Coupon | Hardness (Shore D) | Apparent Density (grams/cm$^3$) |
|---|---|---|
| 1P | 76 | 1.18 |
| 1Q | 75 | 1.18 |
| 1R | 75 | 1.17 |

As is readily apparent in tables 2A-2C, the use of the blended diamine diol curative reduced the hardness of the pad coupons, with the reduction in hardness increasing with increasing diol concentration. The hardness reduction was not a strong function of diol composition. The pad coupons employing the 80D prepolymer were observed to be harder than those employing only 75D prepolymer. The apparent density of the pad coupons was essentially unaffected by the diol composition.

Example 3

The elastic storage modulus (E') was measured as a function of temperature using dynamic mechanical analysis (DMA) for each of the pad coupons disclosed in Example 1. Cured pad coupon samples were cut into 6 mm by 30 mm rectangular specimens and mounted in a tensile clamp. The physical dimensions of each sample were measured using a micrometer prior to the above described DMA testing. The measured dimensions were input into the DMA software prior to mounting the sample in the test chamber. The DMA measurements were made using a Q800 DMA measurement tool available from TA Instruments. DMA measurements were made in accordance with ASTM D4065. Briefly, the DMA tests were conducted using a standard multi-frequency controlled strain tensile mode, with a frequency of 1 Hz, an amplitude of 30 microns, and a temperature ramp rate of 5 degrees C. per minute from −50 to 180 degrees C. under dry condition with air flow.

Those of ordinary skill will readily recognize that there are numerous sample configurations and oscillatory deformation modes for making DMA measurements including flexural, tensile, compression, three-point bending, torsional, single cantilever, dual cantilever, and shear deformation as disclosed in ASTM D4065. It will be understood that there may be certain advantages and disadvantages associated with the selection of any one of these oscillatory deformation modes. Based in part on the ease of use and the good repeatability of the testing results, the DMA measurements disclosed herein utilized oscillatory tensile deformation as described above.

Tables 3A, 3B, and 3C list the measured elastic storage modulus values at 25 degrees C. and 75 degrees C., referred to therein as E'(25) and E'(75), and the corresponding elastic storage modulus ratio E'(25)/E'(75) for each of the pad coupon samples disclosed in Tables 1A, 1B, and 1C, respectively.

TABLE 3A

| Coupon | E'(25) MPa | E'(75) MPa | E'(25)/E'(75) |
| --- | --- | --- | --- |
| 1A | 998 | 238 | 4.2 |
| 1B | 763 | 92 | 8.3 |
| 1C | 709 | 55 | 12.9 |
| 1D | 610 | 90 | 6.8 |
| 1E | 391 | 46 | 8.5 |
| 1F | 708 | 133 | 5.3 |
| 1G | 524 | 57 | 9.2 |
| 1H | 696 | 99 | 7.0 |
| 1I | 449 | 56 | 8.0 |
| 1J | 627 | 91 | 6.9 |
| 1K | 414 | 57 | 7.3 |

TABLE 3B

| Coupon | E'(25) MPa | E'(75) MPa | E'(25)/E'(75) |
| --- | --- | --- | --- |
| 1L | 1748 | 868 | 2.0 |
| 1M | 1733 | 546 | 3.2 |
| 1N | 1521 | 202 | 7.5 |
| 1O | 1451 | 79 | 18.4 |

TABLE 3C

| Coupon | E'(25) MPa | E'(75) MPa | E'(25)/E'(75) |
| --- | --- | --- | --- |
| 1P | 1442 | 622 | 2.3 |
| 1Q | 1470 | 499 | 3.0 |
| 1R | 1310 | 203 | 6.4 |

It is readily apparent from the data set forth in Table 3A that the additional of diol curative decreased the elastic storage modulus of the pad coupons and increased the elastic storage modulus ratio. The pad coupons including CHDM were observed to have the highest elastic storage modulus at 25 degrees C. and the highest elastic storage modulus ratio. As is readily apparent from the data set forth in Tables 3B and 3C, the pads employing the 80D prepolymer have significantly higher elastic storage moduli and lower elastic storage modulus ratio than the pads employing only 75D prepolymer.

FIGS. 1A, 1B and 2A, 2B depict DMA plots of elastic storage modulus and tan delta versus temperature for pad coupons 1A, 1B, and 1C and pad coupons 1L, 1M, 1N, and 1O. It is readily apparent from the DMA plots in FIGS. 1A, 1B and 2A, 2B that increasing the molar ratio of CHDM to diamine curative increases the E' ratio due to softening at elevated polishing temperatures and reduces the temperature of the maximum tan delta value. The use of the above described curative blend including CHDM was observed to result in a hard and stiff thermosetting polishing pad that softens at elevated polishing temperatures (e.g., in a range from about 60 to about 90 degrees C.). In use (e.g., in a CMP operation), the bulk pad may be suitably hard and stiff to promote good planarization efficiency while the surface asperities may soften at polishing temperatures and therefore promote low defectivity.

Example 4

The tensile toughness and elongation to break were determined for pad coupons 1A, 1B, 1L, 1M, and 1N described above in Example 1. Pad coupon samples were prepared as described above in Examples 1 and 3. Each sample was mounted in an Instron 4411 Tensile Strength Testing machine. The measurements were made in accordance with ASTM D638-98 at room temperature using 100 pounds of load cell and a cross head speed of 0.2 inches per minute.

Table 4 lists the measured tensile toughness and elongation to break values for above listed pad coupons.

TABLE 4

| Coupon | Tensile Toughness (MPa) | Elongation at Break (%) |
| --- | --- | --- |
| 1A | 77 | 248 |
| 1B | 108 | 371 |
| 1L | 14 | 41 |
| 1M | 36 | 92 |
| 1N | 76 | 170 |

As is readily apparent from the data set forth in Table 4, the addition of CHDM curative increased both the tensile toughness and elongation to break. By increasing toughness and reducing brittleness (increasing elongation to break), certain embodiments employing CHDM curative may exhibit improved conditionability and improved pad life.

Example 5

A number of polishing pads were prepared for CMP testing. Each of the pads was fabricated using a corresponding commercially available prepolymer, dimethylthiotoluenediamine curative, optional diol curative, and Expancel® 461 DE 20 pore fillers (microspheres). The optional diol curative included CHDM or 2-methyl-1,3 propane diol (PDO). The prepolymer was first mixed with the pore filler to achieve uniform distribution. The dimethylthiotoluenediamine curative and optional diol curative were then mixed with the prepolymer/filler blend. The combined mixture was dispensed onto the base of a 30 inch diameter mold. The mixture remained in the mold for 10 minutes at a temperature of 260 degrees F. The pre-cured pad was then released from the mold and cured in a vented oven for 12 hours at a temperature of 200 degrees F. The pad compositions are listed as parts by weight with each composition normalized to 100 parts by weight prepolymer.

The as-molded pads had a molded groove pattern as shown in FIG. 16 of U.S. Pat. No. 9,180,570 including 16 sectors with each sector including 18 primary grooves. After curing, the pads were surface finished to remove the mold skin of 0.003 to 0.010 inches and thinned from the back side to a final thickness of 0.065 inches using computer numerically controlled (CNC) machining. These top pads (polishing layers) were then laminated with a subpad and a platen adhesive. The pads were then ready for polishing on an Applied Materials Reflexion® polishing tool or cut down to a final diameter of 20 inches for an Applied Materials Mirra® polishing tool.

Table 5 lists four control pads 5A, 5B, 5G, and 5J that do not include the optional diol curative and eight experimental pads 5C, 5D, 5E, 5F, 5H, 5I, 5K, and 5L including diol curative. Experimental pads 5C through 5F, 5H, 5K and 5L are inventive, including polyamine curative to CHDM curative molar ratios ranging from about 2.3:1 to about 5.7:1 for PET75D prepolymer formulations, a molar ratio of about 2.3:1 for the 80DPLF prepolymer formulation and molar ratios of about 4:1 and about 9:1 for the mixed PET75D/80DPLF prepolymer formulations. In Table 5, the mixing ratio of raw materials is described in parts by weight for the control and experimental pads with each pad normalized to 100 parts by weight prepolymer.

TABLE 5

| Pad | 100 Parts Prepolymer | Dimethylthio toluenediamine | Diol | Pore Filler |
|---|---|---|---|---|
| 5A | Imuthane ® PET-75D | 22.0 parts | None | 3 parts |
| 5B | Adiprene ® LF650D | 18.6 parts | None | 4 parts |
| 5C | Imuthane ® PET-75D | 18.5 parts | 2.4 parts CHDM | 4 parts |
| 5D | Imuthane ® PET-75D | 15.4 parts | 4.4 parts CHDM | 4 parts |
| 5E | Imuthane ® PET-75D | 18.5 parts | 2.4 parts CHDM | 3 parts |
| 5F | Imuthane ® PET-75D | 15.4 parts | 4.4 parts CHDM | 3 parts |
| 5G | Andur ® 80DPLF | 25.7 parts | None | 3 parts |
| 5H | Andur ® 80DPLF | 18.0 parts | 5.2 parts CHDM | 3 parts |
| 5I | Andur ® 80DPLF | 18.0 parts | 3.2 parts PDO | 3 parts |
| 5J | 50 parts PET-75D 50 parts 80DPLF | 24.6 parts | None | 3 parts |
| 5K | 50 parts PET-75D 50 parts 80DPLF | 22.2 parts | 1.7 parts CHDM | 3 parts |
| 5L | 50 parts PET-75D 50 parts 80DPLF | 19.7 parts | 3.4 parts CHDM | 3 parts |

Example 6

Polishing pads 5B and 5C (from Example 5) were evaluated in a CMP experiment in which blanket silicon oxide (TEOS) wafers were polished. The pads were evaluated using a Reflexion® CMP tool (available from Applied Materials) using commercial two-part slurry ACS940/ACC260 available from KC Tech. The wafers were polished at a downforce of 3.5 psi, a platen speed of 50 rpm, a head speed of 47 rpm and slurry flow rates of 140 ml/min for the ACS940 and 160 ml/min for the ACC260. The polishing pads were conditioned ex-situ between each wafer sing a Saesol® LPX-DS2 conditioner for 12 seconds with a downforce of 5 pounds. A total of 40 TEOS wafers were polished. Each wafer was polishing for one minute and the total TEOS removal converted to a polishing rate in units of Å/min. The polished wafers were also evaluated for scratches using a KLA-Tencor™ Surfscan® SP2 Defect and Surface Quality Inspection System, with a 2 mm wafer edge exclusion and a 110 nm cut-off. Table 6 discloses the average polishing rate achieved on each of the pads as well as the average and maximum number of defects observed for each pad.

TABLE 6

| Pad | TEOS Rate (Å/min) | Defects (Ave) | Defects (Max) |
|---|---|---|---|
| 5B | 743 | 595 | 1462 |
| 5C | 1250 | 224 | 609 |

As is readily apparent from the polishing data set forth in Table 6, pad 5C including the CHDM, exhibits superior TEOS removal rate and significantly reduced defects (scratches).

Example 7

Pads 5A and 5C (from Example 5) were evaluated in a shallow trench isolation (STI) CMP experiment. The pads were evaluated using a Reflexion® CMP tool using slurry D7805A/B (available from Cabot Microelectronics Corporation) in which one part of the A pack was first combined with 6 parts deionized water and then further combined with 3 parts of the B pack. Blanket silicon oxide wafers as well as Silyb STI pattern wafers were polished at a downforce of 2.0 psi, a platen speed of 93 rpm, and a head speed of 87 rpm, and a slurry flow rate of 250 ml/min. The polishing pads were conditioned in-situ using a Saesol® DS8051 conditioner at a downforce of 6 pounds. The patterned wafers were polished to end-point plus 100 percent over polishing time. Five silicon oxide wafers were evaluated for defects using a KLA-Tencor™ Surfscan® SP3 Defect and Surface Quality Inspection System, with a 2 mm wafer edge exclusion and 70 nm cut-off. Dishing was evaluated using atomic force microscopy (AFM) on a 50×50 µm L/S (50% density). Table 7 lists the removal rate, dishing, and defect counts.

TABLE 7

| Pad | Removal Rate (Å/min) | Dishing (Å) | Defects |
|---|---|---|---|
| 5A | 4079 | 250 | 624 |
| 5C | 3918 | 150 | 298 |

As is readily apparent from the data set forth in Table 7, pad 5C including the CHDM exhibits significantly improved planarity as evidence by reduced dishing and significantly improved defectivity (reduced defects) as evidenced by the lower defect count while achieving a similar removal rate.

Example 8

Pads 5A, 5B, and 5C (from Example 5) were evaluated in a tungsten CMP experiment. The pads were evaluated by polishing Silyb 854 2 k tungsten wafers using a Mirra® CMP tool (available from Applied Materials) and W8900 tungsten CMP slurry available from Cabot Microelectronics Corporation. The slurry was diluted with 5 parts deionized water and hydrogen peroxide to 1 part W8900 slurry. The point of use concentration of hydrogen peroxide was 2 percent. The wafers were polished to endpoint plus 30 percent over polish time at a downforce of 2.0 psi, a platen speed of 115 rpm, a head speed of 121 rpm, and a slurry flow rate of 90 ml/min. The polishing pads were conditioned ex-situ using a Saesol® Cl conditioner for 12 seconds at a downforce of 6 pounds between each wafer. The tungsten pattern removal rate and step height (erosion plus dishing) were evaluated on a 1×1 µm line feature with 50 percent pattern density.

TABLE 8

| Pad | W Pattern Rate (Å/min) | Step Height (Å) |
|---|---|---|
| 5A | 1906 | −35 |
| 5B | 2220 | 64 |
| 5C | 2461 | −4 |

Based on the results set forth in Table 8, pad 5C including the CHDM exhibits improved tungsten polishing rate and improved planarity (a step height of essentially zero).

Example 9

Pads 5C, 5D, 5E, and 5F (from Example 5) were evaluated in a tungsten CMP experiment to further evaluate effects of CHDM level in the experimental pads. As with Example 8, the pads were evaluated by polishing Silyb 854 2 k tungsten wafers using a Mirra® CMP tool (available from Applied Materials) and W8900 tungsten CMP slurry available from Cabot Microelectronics Corporation. The slurry was diluted with 5 parts deionized water and hydrogen peroxide to 1 part W8900 slurry. The point of use concentration of hydrogen peroxide was 2 percent. The wafers were polished to endpoint plus 30 percent over polish time at a downforce of 2.0 psi, a platen speed of 115 rpm, and a head speed of 121 rpm, a slurry flow rate of 90 ml/min. The polishing pads were conditioned ex-situ using a Saesol® Cl conditioner for 12 seconds at a downforce of 6 pounds between each wafer.

Tungsten pattern removal rate and step height (erosion plus dishing) were evaluated on a 50% dense 1×µm line feature and are reported in Table 9. The curative molar ratio refers to the molar ratio of polyamine (dimethylthiotoluenediamine) to CHDM in the blended curative (the curative mixture).

TABLE 9

| Pad | Curative Molar Ratio | W Pattern Rate (Å/min) | Step Height (Å) |
|---|---|---|---|
| 5C | 5.7:1 | 2769 | 30 |
| 5D | 2.3:1 | 2720 | 84 |
| 5E | 5.7:1 | 2554 | 25 |
| 5F | 2.3:1 | 2588 | 72 |

As is evident from the data set forth in Table 9, the pads having a curative molar ratio of 5.7 to 1 exhibit significantly improved planarity as evidenced by the reduced step height as compared to the pads having a curative ratio of 2.3:1. The W pattern removal rate was not observed to depend on the curative ratio.

Example 10

Pads 5A, 5G, 5H, and 5I were evaluated in a 3D NAND staircase CMP experiment. The pads were evaluated by polishing Silyb 3D NAND pattern wafers using a Mirra® CMP tool and slurry D7400 available from Cabot Microelectronics Corporation. The slurry was diluted with 6 parts deionized water to 1 part D7400 slurry. The wafers were polished for 30 s, 60 s and 90 s at a downforce of 3.0 psi, a platen speed of 100 rpm, and a head speed of 85 rpm, at a slurry flow rate of 150 ml/min. The polishing pads were conditioned in-situ using a Saesol® DS8051 conditioner at a downforce of 6 pounds. The wafer topography was evaluated at a 10×5 mm feature with a 2 mm trend width on both sides. Table 10 shows the relative trench loss (relative to pad 5A having no diol curative) at step heights of 0 Å, 1000 Å, and 2000 Å.

TABLE 10

| Pad | Relative Trench Loss at 0 Å Step Height (Å) | Relative Trench Loss at 1000 Å Step Height (Å) | Relative Trench Loss at 2000 Å Step Height (Å) |
|---|---|---|---|
| 5A | — | — | — |
| 5G | 200 | −20 | −120 |
| 5H | −1200 | −670 | −460 |
| 5I | 2100 | 880 | 410 |

Figure 1A:
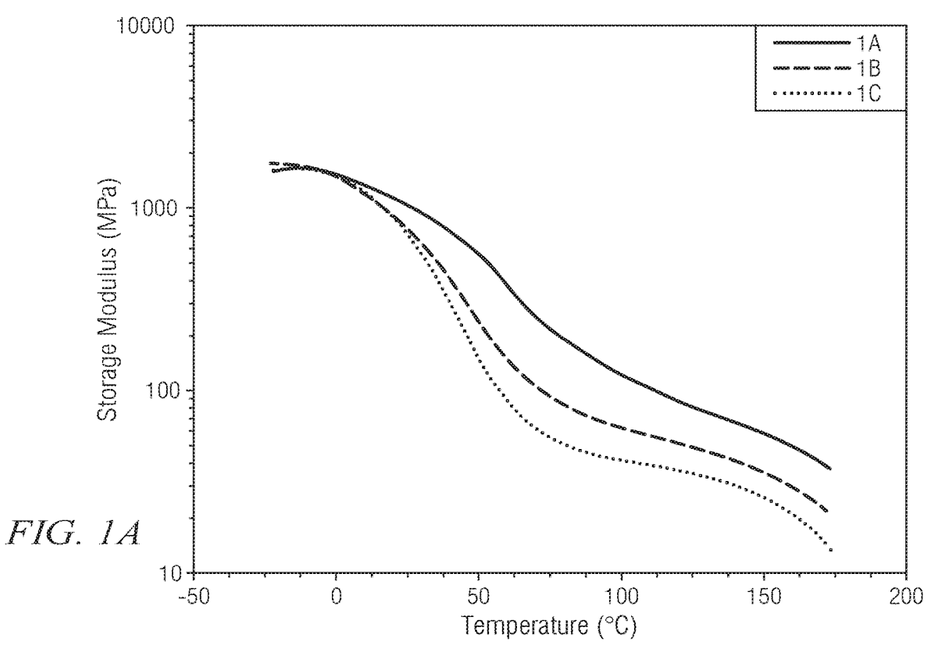
FIGS. 1A and 1B depict plots of the storage modulus E' (1A) and tan(δ) (1B) as a function of temperature for pad coupons 1A, 1B, and 1C disclosed in Examples 1 and 3.
Figure 1B:
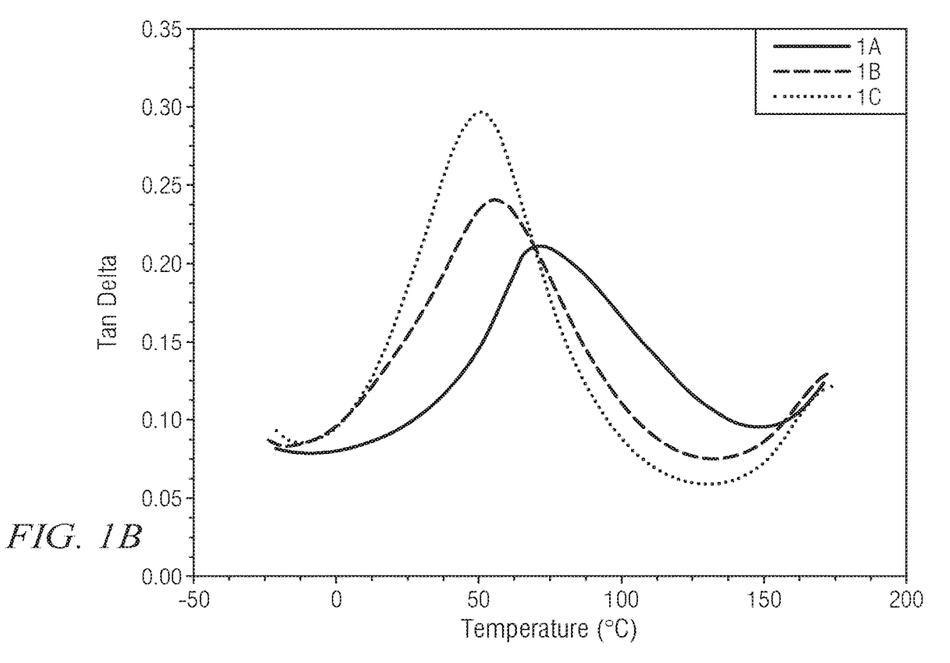
Figure 2A:
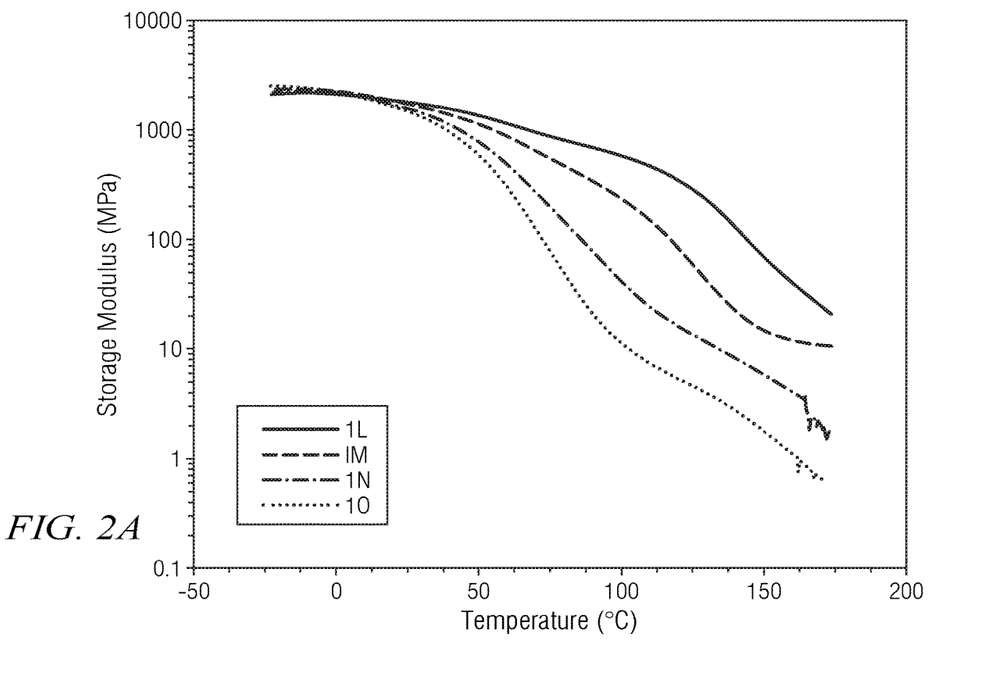
FIGS. 2A and 2B depict plots of the storage modulus E' (2A) and tan(δ) (2B) as a function of temperature for pad coupons 1L, 1M, 1N, and 1O disclosed in Examples 1 and 3.
Figure 2B:
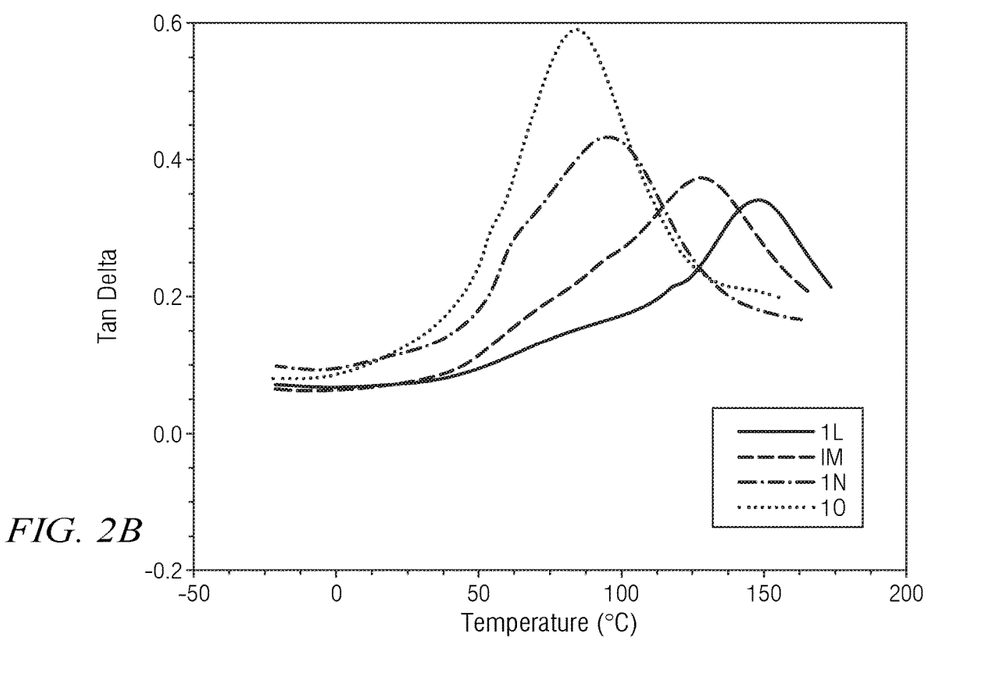
Figure 3:
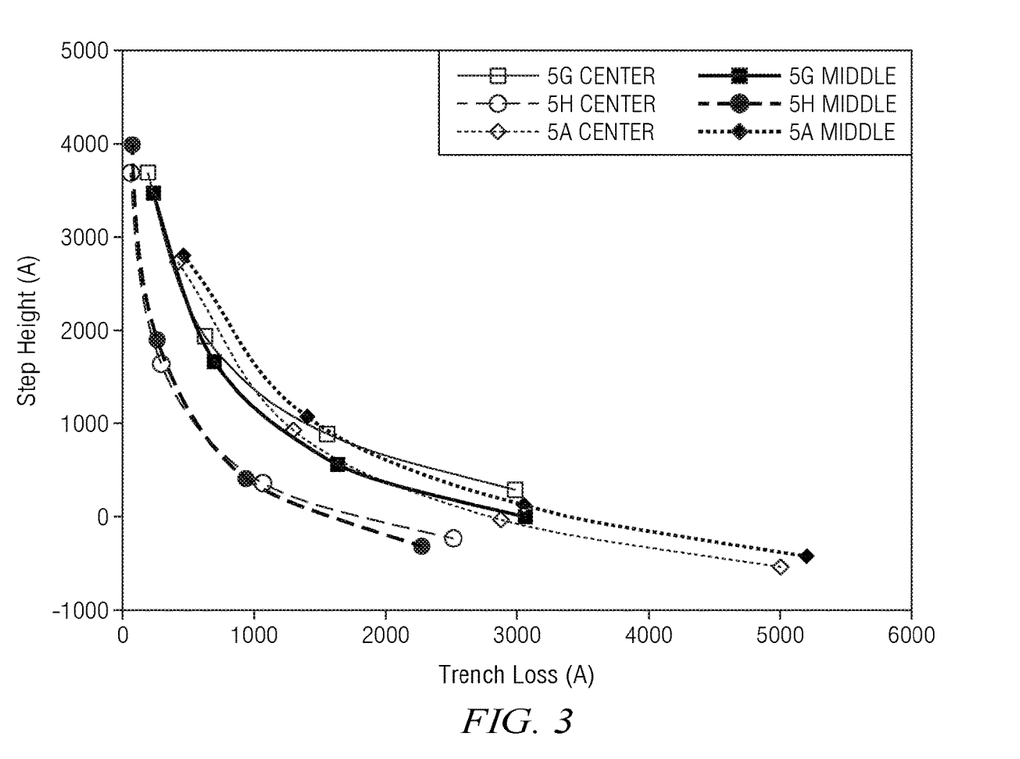
FIG. 3 depicts a plot of step height versus trench loss for center and middle die locations for pads 5A, 5G, and 5H disclosed in Examples 5 and 10.

FIG. 3 depicts a plot of step height versus trench loss for center and middle die locations for pads 5A, 5G, and 5H. As is evident from the data set forth in FIG. 3 and Table 10, polishing pad 5H including CHDM curative provided superior planarization efficiency with respect to trench loss in the 3D NAND staircase experiment.

Example 11

Pads 5A, 5J, and 5K (from Example 5) were evaluated in a tungsten CMP experiment. The pads were evaluated by polishing 754 TEOS-W 5kÅ patterned wafers (available from Advanced Materials Technology, Inc.) using a Reflexion® CMP tool (available from Applied Materials) and W8900 tungsten CMP slurry (available from Cabot Microelectronics Corporation). The slurry was diluted with 5 parts deionized water and hydrogen peroxide to 1 part W8900 slurry. The point of use concentration of hydrogen peroxide was 2 percent. The wafers were polished to endpoint plus 15 seconds over-polish at a downforce of 3.0 psi, a platen speed of 80 rpm, a head speed of 81 rpm, and a slurry flow rate of 100 ml/min. The polishing pads were conditioned ex-situ using a 3M A122 conditioner for 24 seconds at a downforce of 8 pounds between each wafer.

The wafers were evaluated after 60 seconds of polish time to obtain a first pass tungsten pattern removal rate. A second pass tungsten removal rate was obtained after completion of the experiment. Blanket TiN wafers also polished at identical conditions to obtain blanket TiN removal rates. Oxide erosion and dishing were evaluated on a 1×1 µm line feature with 50 percent pattern density. The first and second pass tungsten pattern removal rates, oxide erosion, dishing, oxide loss, and blanket TiN removal rates are listed below in Table 11.

TABLE 11

| Pad | First Pass W RR (Å/min) | Second Pass W RR (Å/min) | Erosion (Å) | Dishing (Å) | Oxide Loss (Å) | TiN RR (Å/min) |
|---|---|---|---|---|---|---|
| 5A | 1732 | 2782 | 258 | 96 | 36 | 2405 |
| 5J | 2330 | 2754 | 279 | 90 | 47 | 3268 |
| 5K | 2121 | 2410 | 171 | 89 | 35 | 3292 |

Based on the results set forth in Table 11, pad 5K including the CHDM exhibits superior first pass tungsten removal rates to pad 5A and nearly equivalent tungsten removal rates to pad 5J while providing significantly improved oxide erosion (a 35 percent reduction as compared to pad 5J).

Example 12

Pads 5A, 5J, 5K, and 5L (from Example 5) were evaluated in a tungsten CMP experiment. The pads were evaluated by polishing 754 TEOS-W 5kÅ patterned wafers (available from Advanced Materials Technology, Inc.) using a Reflexion® CMP tool (available from Applied Materials) and W8902 tungsten CMP slurry (available from Cabot Microelectronics Corporation). The slurry was diluted with 5 parts deionized water and hydrogen peroxide to 1 part W8902 slurry. The point of use concentration of hydrogen peroxide was 5 percent. The wafers were polished to endpoint plus 30 percent over-polish at a downforce of 3.0 psi, a platen speed of 100 rpm, a head speed of 101 rpm, and a slurry flow rate of 250 ml/min. The polishing pads were conditioned in-situ using a Shinhan A37 conditioner at a downforce of 4.5 pounds for 100% of the polish time.

Tungsten pattern removal rate, oxide erosion, and dishing were evaluated on a 50% dense 1×µm line feature and are reported in Table 12. The field oxide removal rate is also reported in Table 12.

TABLE 12

| Pad | Tungsten RR (Å/min) | Erosion (Å) | Dishing (Å) | Oxide RR (Å/min) |
|---|---|---|---|---|
| 5A | 5243 | 88 | 48 | 60 |
| 5J | 6773 | 57 | 51 | 47 |
| 5K | 6310 | 14 | 54 | 53 |
| 5L | 6433 | 4 | 57 | 59 |

As is evident from the data set forth in Table 12, pads 5K and 5L have a significantly improved W removal rate as compared to pad 5A and a nearly equivalent W removal rate as compared to pad 5J. Pads 5K and 5L (including the CHDM curative) further exhibit significantly improved oxide erosion (over 70% reduction).

It will be understood that the inventive polishing pads may optionally have a polishing surface that includes grooves, channels, and/or perforations which facilitate the lateral transport of polishing compositions, such as slurries, across the polishing surface of the pad. Such grooves, channels, or perforations may be in substantially any suitable pattern, for example, including slanted grooves, radial grooves, concentric grooves, spiral or circular grooves, and/or XY crosshatch grooves, and may be continuous or non-continuous in connectivity. Such optional grooves, channels, and/or perforations may further have substantially any suitable depth, width, and pitch. Moreover, the polishing pad may have two or more different groove patterns, for example, as disclosed in U.S. Pat. No. 9,180,570.

The inventive polishing pads are particularly suited for use in conjunction with a chemical-mechanical polishing (CMP) apparatus. Typically, the apparatus includes a platen, which, when in use, is in motion and has a velocity that results from orbital, linear, or circular motion. The disclosed polishing pads may be configured for adhering to the platen such that they move with the platen. The apparatus generally further includes a carrier that holds a workpiece, such as a wafer, to be polished by contacting and moving relative to the surface of the polishing pad. The polishing of the workpiece takes place by placing the workpiece in contact with the polishing pad and generating relative motion between the polishing pad and the workpiece, typically with a polishing composition therebetween, so as to abrade at least a portion of the workpiece thereby polishing the workpiece. The polishing composition may include a liquid carrier (e.g., an aqueous carrier) and an optional abrasive. Depending on the type of workpiece being polished, the polishing composition may further optionally include one or more oxidizing agents, organic acids, complexing agents, pH buffers, surfactants, corrosion inhibitors, anti-foaming agents, biocides, and the like. The CMP apparatus may be any suitable CMP apparatus, many of which are known in the art.

Common CMP apparatuses include an in situ polishing endpoint detection system, many of which are known in the art. Techniques for inspecting and monitoring the polishing process by analyzing light or other radiation reflected from a surface of the workpiece are well known in the art and commonly used in commercial CMP operations. Example methods and systems are described in U.S. Pat. Nos. 5,196,353, 5,433,651, 5,609,511, 5,643,046, 5,658,183, 5,730,642, 5,838,447, 5,872,633, 5,893,796, 5,949,927, and 5,964,643. As such the inventive polishing pads may optionally include one or more transparent windows or apertures formed therein to facilitate such endpoint detection.

The inventive polishing pads may be used alone or optionally may be used as a polishing layer in a multi-layer stacked polishing pad. For example, the disclosed polishing pads may be used in combination with substantially any suitable subpad. Example subpads include polyurethane foam subpads (e.g., PORON® foam subpads from Rogers Corporation), impregnated felt subpads, microporous polyurethane subpads, or sintered urethane subpads. The subpad may be either softer or harder than the disclosed polishing pads and may therefore be more or less compressible and have a lower or higher Shore D hardness value than the disclosed polishing pads. The subpad may optionally include grooves, channels, hollow sections, windows, apertures, and the like. When the disclosed pads are used with with a subpad, an intermediate backing layer such as a polyethyleneterephthalate film may be deployed between between the polishing pad and the subpad. The disclosed embodiments are not limited to the use of a subpad or the properties of a subpad when used.

The disclosed polishing pads may be suitable for use in polishing many types of workpieces (e.g., substrates or wafers) and workpiece materials. For example, the disclosed pads may be used to polish workpieces including memory storage devices, semiconductor substrates, and glass substrates. Suitable workpieces for polishing with the polishing pads include memory or rigid disks, magnetic heads, MEMS devices, semiconductor wafers, field emission displays, and other microelectronic substrates, especially microelectronic substrates comprising insulating layers (e.g., silicon dioxide, silicon nitride, or low dielectric materials) and/or metal-containing layers (e.g., copper, tantalum, tungsten, aluminum, nickel, titanium, platinum, ruthenium, rhodium, iridium or other noble metals). The disclosed embodiments are not limited in regards to the workpiece to be polished.

Although polishing pads employing polyamine curative and CHDM curative and certain advantages thereof have been described in detail, it should be understood that various changes, substitutions and alternations can be made herein without departing from the spirit and scope of the disclosure as defined by the appended claims.

The invention claimed is:

1. A chemical-mechanical polishing pad comprising a thermosetting polyurethane polishing layer, the thermosetting polishing layer comprising:
   an isocyanate-terminated urethane prepolymer;
   a polyamine curative; and
   a cyclohexanedimethanol curative;
   wherein the polyamine curative and the cyclohexanedimethanol curative are in a molar ratio of polyamine curative to cyclohexanedimethanol curative in a range from about 20:1 to about 1:1.

2. The polishing pad of claim 1, wherein the prepolymer is a reaction product of a toluene diisocyante (TDI) compound or a methylenediphenyl diisocyanate (MDI) compound and polytetramethylene ether glycol (PTMEG) or polypropylene ether glycol.

3. The polishing pad of claim 1, wherein the prepolymer is an aromatic prepolymer selected from the group consisting of 75D prepolymers, 80D prepolymers, and mixtures thereof.

4. The polishing pad of claim 1, wherein the polyamine curative is an aromatic diamine curative selected from the group consisting of aniline diamine compounds, toluene diamine compounds, aminobenzoate compounds, and mixtures thereof.

5. The polishing pad of claim 4, wherein the aromatic diamine curative is selected from the group consisting of 4,4-methylenebis(2chloroaniline), dimethylthiotoluenediamine, and mixtures thereof.

6. The polishing pad of claim 1, wherein the molar ratio of polyamine curative to cyclohexanedimethanol curative is in a range from about 10:1 to about 1.5:1.

7. The polishing pad of claim 1, wherein the thermosetting polyurethane polishing layer comprises surface asperities and wherein the surface asperities have a ratio of a storage modulus at 25 degrees C. to a storage modulus at 75 degrees C. in a range from about 3 to about 20.

8. The polishing pad of claim 7, wherein:
the isocyanate-terminated urethane prepolymer includes a 75D prepolymer; and
the surface asperities have a storage modulus (E') at 25 degrees C. greater than about 500 MPa and a Shore D hardness at 25 degrees C. greater than about 60.

9. The polishing pad of claim 8, wherein the surface asperities have a tensile toughness at 25 degrees C. greater than about 100 MPa.

10. The polishing pad of claim 7, wherein:
the isocyanate-terminated urethane prepolymer includes an 80D prepolymer; and
the surface asperities have a storage modulus (E') at 25 degrees C. greater than about 1000 MPa and a Shore D hardness at 25 degrees C. greater than about 70.

11. The polishing pad of claim 10, wherein the surface asperities have a tensile toughness at 25 degrees C. greater than about 50 MPa.

12. The polishing pad of claim 1, wherein the thermosetting polyurethane polishing layer further comprises a sufficient quantity of hollow microspheres such that the thermosetting polyurethane polishing layer has a porosity in a range from about 10 to about 50 percent.

13. The polishing pad of claim 1, wherein:
the prepolymer is an aromatic prepolymer selected from the group consisting of 75D prepolymers, 80D prepolymers, and mixtures thereof;
the polyamine curative is an aromatic diamine curative selected from the group consisting of 4,4-methylenebis (2chloroaniline), dimethylthiotoluenediamine, and mixtures thereof; and
the molar ratio of polyamine curative to cyclohexanedimethanol curative is in a range from about 10:1 to about 1.5:1.

14. The polishing pad of claim 1, wherein the thermosetting polyurethane polishing layer is adhered to a sub-pad.

15. A chemical-mechanical polishing pad comprising a thermosetting polyurethane polymer polishing layer, the thermosetting polishing layer comprising:
an isocyanate-terminated urethane prepolymer; and
a curative mixture comprising a polyamine curative and a cyclohexanedimethanol curative, wherein the curative mixture comprises from about 5 to about 50 mole percent of the cyclohexanedimethanol curative.

16. The polishing pad of claim 15, wherein the prepolymer is a reaction product of a toluene diisocyante (TDI) compound or a methylenediphenyl diisocyanate (MDI) compound and polytetramethylene ether glycol (PTMEG) or polypropylene ether glycol.

17. The polishing pad of claim 15, wherein the prepolymer is an aromatic prepolymer selected from the group consisting of 75D prepolymers, 80D prepolymers, and mixtures thereof.

18. The polishing pad of claim 15, wherein the polyamine curative is an aromatic diamine curative selected from the group consisting of aniline diamine compounds, toluene diamine compounds, aminobenzoate compounds, and mixtures thereof.

19. The polishing pad of claim 18, wherein the aromatic diamine curative is selected from the group consisting of 4,4-methylenebis(2chloroaniline), dimethylthiotoluenediamine, and mixtures thereof.

20. The polishing pad of claim 15, wherein the curative mixture comprises from about 10 to about 40 weight percent of the cyclohexanedimethanol curative.

21. The polishing pad of claim 15, wherein the curative mixture consists of the polyamine curative and the cyclohexanedimethanol curative.

22. The polishing pad of claim 15, wherein the thermosetting polyurethane polishing layer comprises surface asperities and wherein the surface asperities have a ratio of a storage modulus at 25 degrees C. to a storage modulus at 75 degrees C. in a range from about 3 to about 20.

23. The polishing pad of claim 22, wherein:
the isocyanate-terminated urethane prepolymer includes a 75D prepolymer; and
the surface asperities have a storage modulus (E') at 25 degrees C. greater than about 500 MPa and a Shore D hardness at 25 degrees C. greater than about 60.

24. The polishing pad of claim 23, wherein the surface asperities have a tensile toughness at 25 degrees C. greater than about 100 MPa.

25. The polishing pad of claim 22, wherein:
the isocyanate-terminated urethane prepolymer includes an 80D prepolymer; and
the surface asperities have a storage modulus (E') at 25 degrees C. greater than about 1000 MPa and a Shore D hardness at 25 degrees C. greater than about 70.

26. The polishing pad of claim 25, wherein the surface asperities have a tensile toughness at 25 degrees C. greater than about 50 MPa.

27. The polishing pad of claim 15, wherein the thermosetting polyurethane polishing layer further comprises a sufficient quantity of hollow microspheres such that the thermosetting polyurethane polishing layer has a porosity in a range from about 10 to about 50 percent.

28. The polishing pad of claim 15, wherein:
the prepolymer is an aromatic prepolymer selected from the group consisting of 75D prepolymers, 80D prepolymers, and mixtures thereof;
the polyamine curative is an aromatic diamine curative selected from the group consisting of 4,4-methylenebis (2chloroaniline), dimethylthiotoluenediamine, and mixtures thereof; and
the curative mixture comprises from about 10 to about 40 weight percent of the cyclohexanedimethanol curative.

29. The polishing pad of claim 15, wherein the thermosetting polyurethane polishing layer is adhered to a sub-pad.

* * * * *